K. AIR & M. LEE.
DEVICE FOR TEACHING VALUES OF MUSICAL CHARACTERS.
APPLICATION FILED NOV. 20, 1917.
1,286,896.
Patented Dec. 10, 1918.
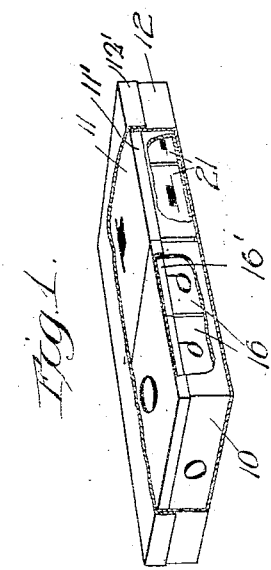
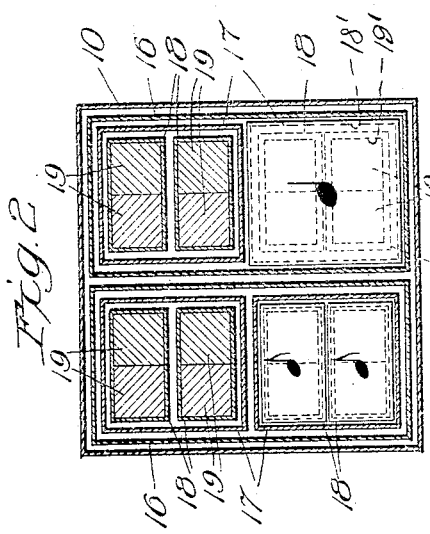
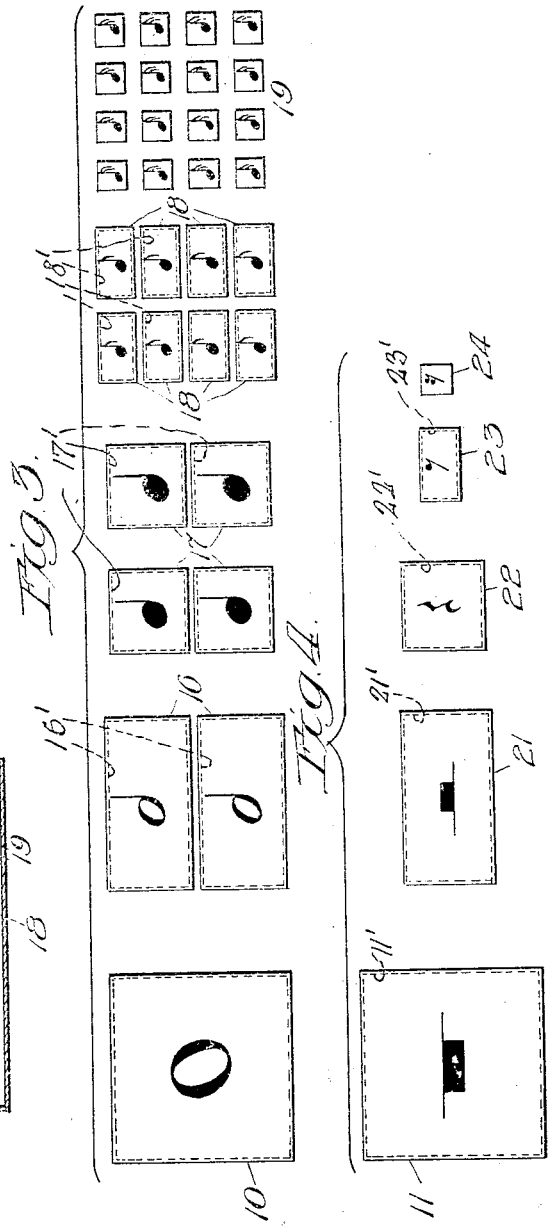
Witness:
Harry S. Gaither
Inventors:
Kathleen Air
Mabel Lee
by William H. Hole
Atty

UNITED STATES PATENT OFFICE.

KATHLEEN AIR AND MABEL LEE, OF CHICAGO, ILLINOIS.

DEVICE FOR TEACHING VALUES OF MUSICAL CHARACTERS.

1,286,896.  Specification of Letters Patent.  Patented Dec. 10, 1918.

Application filed November 20, 1917.  Serial No. 202,896.

*To all whom it may concern:*

Be it known that we, KATHLEEN AIR and MABEL LEE, citizens of the United States, and residents of Chicago, in the county of Cook and State of Illinois, have invented certain new and useful Improvements in Devices for Teaching Values of Musical Characters; and we do hereby declare that the following is a full, clear, and exact description thereof, reference being had to the accompanying drawings and to the characters of reference marked thereon, which form a part of this specification.

This invention relates to a novel device for teaching young children fractional values of subjects matter, the characters of which are printed, such as the notes of music, the rest designations used in music, and the like.

The purpose of the invention is to assist the child to mentally grasp the value of notes by sight through the physical handling of objects severally appropriated to the notes of different values, said objects bearing numerical integral and fractional values as do the characters represented by the printed notes, rests and the like. The objects will severally bear the notes or other characters to which they are appropriated. The child, by handling the different integrally and fractionally related objects, is able to correlate them to the note or rest characters printed thereon and on the music sheet, and thereby the device enables the child to more readily fix in his mind the values of the printed notes or rests.

A device embodying our invention embraces a plurality of separate objects, one of which, appropriated to a whole note, a whole rest or the like, may be termed the integral unit of the series; and each of the elements of the other series is of a dimension substantially corresponding to one half of that of the next larger element, so that thereby the number of elements in each of the fractional series is a fixed multiple of the integral unit.

Furthermore, the arrangement of the device contemplates the inclosing of all fractional elements in the integral unit, said integral unit having the form of a box of a shape and size to receive the elements of the first fractional series. Likewise, the remaining elements have the form of boxes to receive their corresponding fractional elements with the exception of the last elements of the series which may be solid.

For instance, the largest box or receptacle is appropriated to the whole note. Within this box are two equally dimensioned boxes, preferably of a size to fill the outer box, and these two boxes are appropriated to the half notes. Each of the two half note boxes contains two equally dimensioned boxes which fill it, the two boxes together containing four boxes. These latter boxes are appropriated to the quarter notes. In a similar way each of the four quarter note boxes contains two equally dimensioned boxes which are appropriated to the eighth notes, there being eight of such boxes contained in the four quarter note boxes. Each of the eighth note boxes also contains two equally dimensioned objects, which are appropriated to sixteenth notes, and these objects may be boxes if the fractional dimensions are to be carried farther, or may be solid objects if the device is limited in its scope to the teaching of notes from whole to sixteenth values.

From the foregoing it will be observed that the number of elements in each larger box indicates the fractional values of the notes to which said elements are appropriated, as, for instance, the two half note boxes in a whole note box denote to the child that the value of a half note is one half of the value of a whole note. Similarly the four quarter note boxes, with two boxes contained in each half note box, will denote to the child, not only that the value of the quarter note is one half the value of a half note, but that, there being four quarter notes associated with the integral or whole note box, the value of said quarter note will be one fourth that of the whole note, and so on throughout the series.

The foregoing illustrations likewise apply to a series of units appropriated to rests of different characters which a young child may not readily grasp from the printed page.

In the drawings are illustrated two series of devices, one appropriated to note characters and the other to rest characters. It will be convenient to supply both sets of characters as a unitary set, inasmuch as the rest characters will be used contemporaneous with the note characters.

In said drawings:

Figure 1 illustrates two sets of elements contained in a single box or casing, partially broken away to show the nesting of the boxes.

Fig. 2 is a horizontal section of the nested boxes of one of the series.

Fig. 3 illustrates the entire series of note elements, separated to show their fractional relations to each other and to the integral element.

Fig. 4 illustrates one of the elements of each of a similar series appropriated to rest characters.

As shown in said drawings, 10, 11 designate respectively the integral note and rest elements which are conveniently contained in a single box or receptacle 12 for the purpose of conveniently handling them. The size, shape and agroupment of the blocks of the two series are alike, being only differentiated by the characters which they bear.

16, 16 designate the half note elements of the note series; 17, 17 the quarter note elements; 18, 18 the eighth note elements, and 19, 19 the sixteenth note elements. Preferably and as herein shown, the integral element or block 10 is square, in which event the second and fourth elements of the series are oblong to fill their inclosing larger boxes, while the third and fifth elements of the series are square, each two of the latter elements filling a box appropriated to the next higher note value. In a similar way the elements 11, 21, 22, 23 and 24 of Fig. 4 are appropriated respectively to the full, half, quarter, eighth and sixteenth rest characters.

The several elements may bear on all or a number of sides thereof the note or rest characters to which they are severally appropriated, so that the designating characters of an element may be read from any position thereof. Preferably all the boxes are provided with covers so that when a box is filled with the boxes designating a lower value, each filled and covered box designates an integral element of its own class or series relatively to the fractional value of the next lower series. Said covers are indicated in full and dotted lines in the drawing, each of said covers bearing an exponent reference numeral corresponding to its designating numeral, as for instance, 10′; 11′; 16′, 21′, etc.

The use of the device in teaching note and rest values will be apparent from the foregoing. The child, associating the whole note or rest character with the single unitary element, will be able to more fixedly grasp the meaning of the value of the whole note or rest, inasmuch as the average child will first learn numerical values by handling the objects counted. The child will likewise learn the relation of the integral unit to the fractional elements and learn the relation of the fractional elements to each other. In thus grouping the elements of the several series and comparing them to the elements of larger values and dissecting and counting the elements of fractional values the child becomes familiar with the relations of one series of elements to the others, and also becomes acquainted with the distinguishing element characters of the different series so as to recognize said element characters and their values when seen on the printed page.

We claim as our invention:

1. A device for teaching the value of musical characters, comprising an integral unit element and a series of fractional elements which are dimensionally related to the integral unit element and to each other substantially as fractional musical notes and rests are related in value to integral unit notes and rests and to each other, the integral unit element and each of the fractional elements, with the exception of the last elements, being hollow to receive proper multiples of the elements of the next lower values.

2. A device for teaching the value of musical characters, comprising an integral unit element and a series of fractional elements which are dimensionally related to the integral unit element and to each other substantially as fractional musical notes and rests are related in value to integral unit notes and rests and to each other, the integral unit element and each of the fractional elements, with the exception of the last elements, having the form of a box of a size to contain multiples of the elements of the next lower values, and removable covers for said boxes.

3. A device for teaching the value of musical characters, comprising an integral unit element and a series of fractional elements which are dimensionally related to the integral unit element and to each other substantially as fractional musical notes and rests are related in value to integral unit notes and rests and to each other, the integral unit element and each of the fractional elements, with the exception of the last elements, being hollow to receive proper multiples of the elements of the next lower values, said unit element and the fractional elements bearing on their outer faces value designated characters.

In witness whereof we claim the foregoing as our invention, and we hereunto append our signatures in the presence of two witnesses at Chicago, Illinois this 3rd day of November, 1917.

KATHLEEN AIR.
MABEL LEE.

Witnesses:
W. L. HALL,
G. A. SOUTHWELL.

Copies of this patent may be obtained for five cents each, by addressing the "Commissioner of Patents, Washington, D. C."